May 13, 1924.  1,493,868
W. S. ROBERTSON
APPARATUS FOR MAKING FINGER RINGS AND THE LIKE
Filed Aug. 29, 1922   2 Sheets-Sheet 1

Inventor:
Walter Stanley Robertson,
By Paul Reilly
Attorney.

May 13, 1924.

W. S. ROBERTSON

APPARATUS FOR MAKING FINGER RINGS AND THE LIKE

Filed Aug. 29, 1922    2 Sheets-Sheet 2

1,493,868

Inventor:
Walter Shanley Robertson,
By Paul Reilly
Attorney.

Patented May 13, 1924.

1,493,868

UNITED STATES PATENT OFFICE.

WALTER SHANLEY ROBERTSON, OF PHILADELPHIA, PENNSYLVANIA, ASSIGNOR TO THE CHAS. H. ELLIOTT COMPANY, A CORPORATION OF DELAWARE.

APPARATUS FOR MAKING FINGER RINGS AND THE LIKE.

Application filed August 29, 1922. Serial No. 584,943.

*To all whom it may concern:*

Be it known that I, WALTER SHANLEY ROBERTSON, a citizen of the United States, residing at Philadelphia, in the county of Philadelphia and State of Pennsylvania, have invented certain new and useful Improvements in Apparatus for Making Finger Rings and the like, of which the following is a specification.

My invention relates to apparatus for making finger rings and the like whereby the rings may be easily and expeditiously shaped and formed from the blanks, and when so formed will be smooth and regular and will require a minimum of finishing.

Heretofore, it has been customary to form finger rings from the blanks by hammering the same around mandrels of the desired diameter, this operation requiring the utmost care and skill on the part of the operator to avoid irregularities and lack of smoothness in the finished article.

The object, therefore, of the present invention is to provide a simple and efficient apparatus whereby finger rings may be formed from the blanks to the desired shape easily and expeditiously, requiring a minimum of skill on the part of the operator, and resulting in a better and more uniform product.

The nature and characteristic features of my invention will be more readily understood from the following description, taken in connection with the accompanying drawings forming part hereof, in which Figure 1 is a front elevation of apparatus for carrying out and embodying the main features of my present invention, the same being shown in an intermediate position assumed during the process of shaping a finger ring from the blank;

Figure 1:
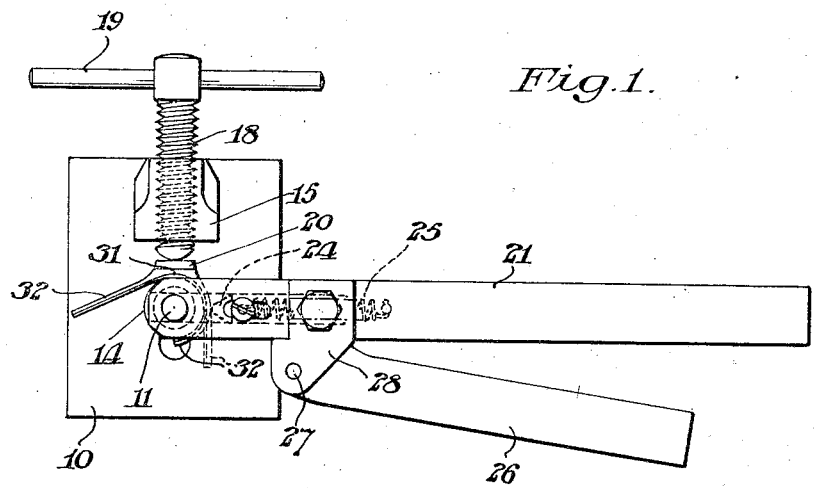
Figure 2:
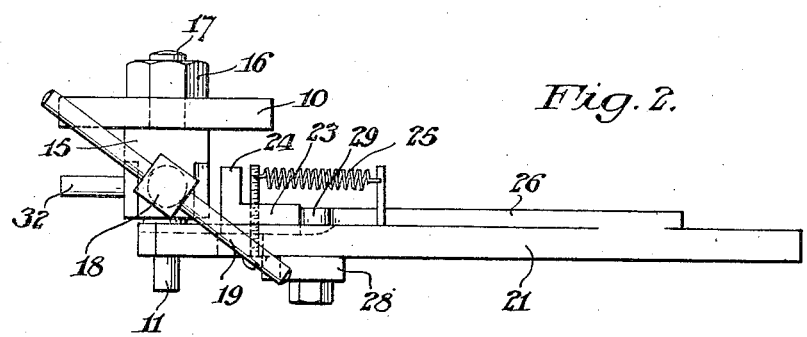
Fig. 2 is a top or plan view thereof.

Referring to the drawings, in the particular embodiment of the apparatus of my invention therein shown, 10 is a supporting plate to which an arbor 11 is secured in any suitable manner, as, for example, by a nut 12 mounted on a threaded portion 13 of the arbor 11, which threaded portion 13 extends through an aperture in the plate 10. Mounted on the arbor 11 is a removable sleeve 14, the same being removable so as to enable sleeves of various sizes to be employed, whereby rings of various sizes may be formed by the apparatus. A block 15 is also secured to the plate 10 in any suitable manner, as, for example, by a nut 16 which is threaded on a portion 17 of the block member 15, which threaded portion 17 also passes through an aperture in the plate 10.

A bolt 18 is threaded in the block member 15 and is provided with a handle 19 for manual operation by the user. The lower end of the bolt 18 is directed toward the arbor 11, and a plate 20 is preferably arranged below the lower end of the bolt 18, the plate 20 being adapted to bear against a ring blank, and being firmly held against said ring blank by means of the bolt 18 while the operation of shaping the ring is progressing.

The forming tool proper comprises a bar member 21, one end of which is provided with a circular aperture 22 whereby the end of the bar 21 is adapted to be rotatably mounted on the arbor 11. Slidably mounted on the bar 21 is a block 23, the forward end of which is provided with a rounded V-shaped nose 24. A spring 25 normally tends to retract the slide member 23 in a direction away from the aperture 22, and consequently away from the arbor 11 upon which the bar 21 is rotatably mounted during the forming operation. A lever 26 is pivoted, as at 27, to the bar 21, a bracket 28 secured to the bar 21 being provided for this purpose if desired. The lever 26 is provided with a projecting lug 29 which is adapted to bear against the slidable member 23, the arrangement being such that when the lever 26 is manually operated the slide member may be arbitrarily advanced toward the arbor 11 upon which the bar 21 is rotatably mounted, as hereinbefore mentioned.

The manner of operation of the apparatus hereinabove described may now be more readily understood.

Figure 3:
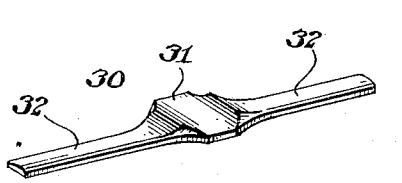
Figs. 3 and 4 are perspective views, respectively, of the blank before and after the same has been operated on by means of the apparatus shown in Figs. 1 and 2 of the drawings.
Figure 6:
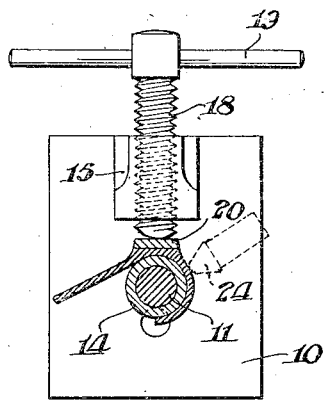
Fig. 6 is a fragmentary sectional view, taken approximately on the line 6—6 of Fig. 5, illustrating more in detail the manner of operation of the apparatus.
Figure 7:
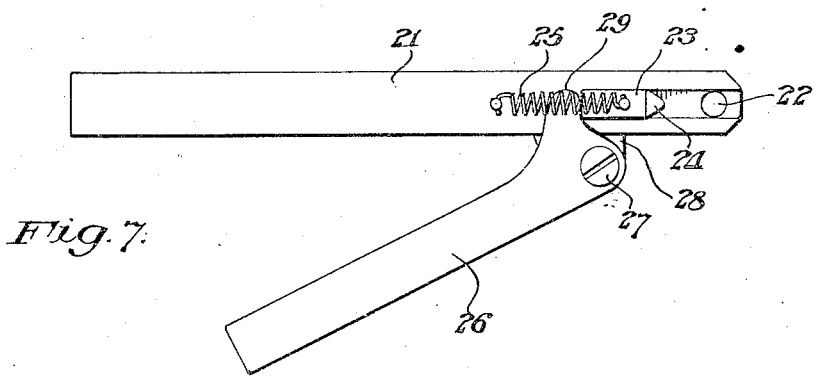
Fig. 7 is a rear elevational view of a portion of the apparatus, detached.

The blank 30 comprises an enlarged central portion 31, the top surface of which has an initially depressed curvature (see Fig. 3). From the enlarged central portion of the blank there extends on each side relatively thinner projecting portions 32. When it is desired to shape a blank of the form above described into the configuration illustrated in Fig. 4 of the drawings, a sleeve 14 of the desired diameter is first mounted upon the arbor 11. The blank is then placed upon the top of said sleeve, the plate member 20 being superposed upon the enlarged central portion 31 of the ring blank. The under surface of the plate 20, it should be understood, is preferably made flat, so that when the bolt 18 is screwed down to cause the plate member 20 to clamp the blank on the sleeve 14 which is mounted upon the arbor 11, the top curved surface of the enlarged portion 31 will be flattened out, and the extending portions 32 of the blank will thereby be given an initial bent position, as partially illustrated in Figs. 1 and 6 of the drawings.

Figure 4:
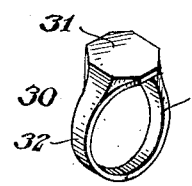
Figure 5:
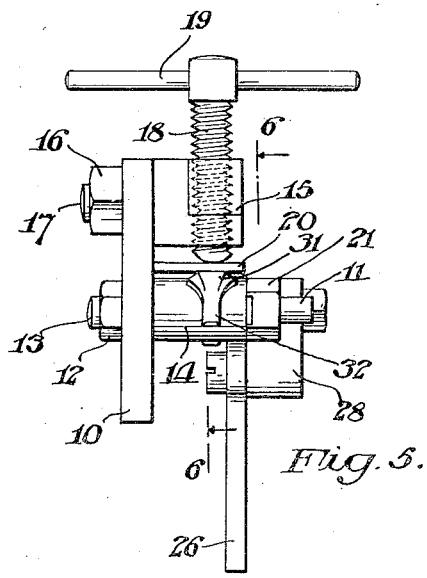
Fig. 5 is an end elevation of the apparatus shown in Figs. 1 and 2.

The forming tool proper is now mounted upon the arbor 11, the rounded V-shaped nose 24 of the slide member 23 thereof being first caused to impinge against the blank on one side of and adjacent to the enlarged portion, this operation being accomplished by actuation of the hand lever 26. The forming tool is now rotated on the arbor 11, the rounded V-shaped nose 24 being firmly held, by pressure on the hand lever 26, against the outer surface of the extending portion 32 of the ring blank. As the forming tool is rotated on the arbor 11 as a pivot, the extending portion 32 of the ring blank on one side will be caused to conform to the surface of the sleeve 14 which is mounted upon the arbor 11. The operation is then repeated on the other side, so that the blank will be shaped as shown in Fig. 4 of the drawings.

The operation is quickly accomplished, and results in a smoothly formed ring blank of circular shape, requiring a minimum of finishing thereafter.

Having thus described the nature and characteristic features of my invention, what I claim as new and desire to secure by Letters Patent is:

1. Apparatus for shaping finger rings and the like comprising an arbor, means for clamping a ring blank at a fixed position with respect to said arbor, and a forming tool adapted to be pivotally mounted on said arbor, said forming tool comprising a bar, a movable member carried thereby adapted to slidably engage the ring blank, and a manually operable lever engaging said movable member and adapted to hold the same against the ring blank and to thereby bend said ring blank around the arbor as the forming tool is rotated about said arbor.

2. Apparatus for shaping finger rings and the like comprising an arbor, means for clamping a ring blank at a fixed position with respect to said arbor, and a forming tool adapted to be pivotally mounted on said arbor, said forming tool comprising a bar, a slide member carried thereby, said slide member having a rounded V-shaped nose adapted to slidably engage the ring blank, and a manually operable lever engaging said slide member and adapted to hold the same against the ring blank and to thereby bend said ring blank around the arbor as the forming tool is rotated about said arbor.

3. Apparatus for shaping finger rings and the like comprising an arbor, means for clamping a ring blank with respect to said arbor, and a forming tool adapted to be pivotally mounted on said arbor, said forming tool comprising a bar, a movable member carried thereby having a portion adapted to engage the ring blank, a spring for normally retracting said movable member, and a manually operable lever engaging said member and adapted to hold the same against the ring blank and to thereby bend said ring blank around the arbor as the forming tool is rotated about said arbor.

4. Apparatus for shaping finger rings and the like comprising an arbor, means for clamping a ring blank with respect to said arbor, and a forming tool adapted to be pivotally mounted on said arbor, said forming tool comprising a bar, a slide member carried thereby, said slide member having a portion adapted to engage the ring blank, a spring for normally retracting said slide member, and a manually operable lever engaging said slide member and adapted to hold the same against the ring blank and to thereby bend said ring blank around the arbor as the forming tool is rotated about said arbor.

5. Apparatus for shaping finger rings and the like comprising an arbor, means for clamping a ring blank with respect to said arbor, and a forming tool adapted to be pivotally mounted on said arbor, said forming tool comprising a bar, a slide member carried thereby, said slide member having a rounded V-shaped nose adapted to engage the ring blank, a spring for normally retracting said slide member, and a manually operable lever engaging said slide member and adapted to hold the same against the ring blank and to thereby bend said ring blank around the arbor as the forming tool is rotated about said arbor.

6. Apparatus for shaping finger rings and the like comprising a supporting plate, an arbor rigidly secured thereto, a removable sleeve mounted on said arbor, a bracket member carried by said plate, a clamping screw threaded in said bracket member, said clamping screw projecting toward said arbor and the sleeve mounted thereon and adapted to clamp the ring blank thereon, a plate member having a flat lower surface adapted to be interposed between the clamping screw and the ring blank, and a forming tool adapted to be pivotally mounted on said arbor, said forming tool having means adapted to engage and bend said ring blank around the sleeve as the forming tool is rotated about the arbor.

7. Apparatus for shaping finger rings and the like comprising a supporting plate, an arbor rigidly secured thereto, a bracket member carried by said plate, a clamping screw threaded in said bracket member, said clamping screw projecting toward said arbor and adapted to clamp the ring blank at a fixed position with respect to said arbor, a forming tool adapted to be pivotally mounted on said arbor, said forming tool comprising a bar, a slide member carried thereby adapted to slidably engage the ring blank, and a manually operable lever engaging said slide member and adapted to hold the same against the ring blank and to bend said ring blank around the arbor as the forming tool is rotated about said arbor.

8. Apparatus for shaping finger rings and the like comprising a supporting plate, an arbor rigidly secured thereto, a bracket member carried by said plate, a clamping screw threaded in said bracket member, said clamping screw projecting toward said arbor and adapted to clamp the ring blank thereon, a forming tool adapted to be pivotally mounted on said arbor, said forming tool comprising a bar, a slide member carried thereby, said slide member having a rounded V-shaped nose adapted to engage the ring blank, and a manually operable lever engaging said slide member and adapted to hold the same against the ring blank and to bend said ring blank around the arbor as the forming tool is rotated about said arbor.

9. Apparatus for shaping finger rings and the like comprising a supporting plate, an arbor rigidly secured thereto, a removable sleeve mounted on said arbor, a bracket member carried by said plate, a clamping screw threaded in said bracket member, said clamping screw projecting toward said arbor and the sleeve mounted thereon and adapted to clamp the ring blank thereon, a forming tool adapted to be pivotally mounted on said arbor, said forming tool comprising a bar, a slide member carried thereby, said slide member having a rounded V-shaped nose adapted to engage the ring blank, and a manually operable lever engaging said slide member and adapted to hold the same against the ring blank and to bend said ring blank around the sleeve as the forming tool is rotated about the arbor.

10. Apparatus for shaping finger rings and the like comprising a supporting plate, an arbor rigidly secured thereto, a removable sleeve mounted on said arbor, a bracket member carried by said plate, a clamping screw threaded in said bracket member, said clamping screw projecting toward said arbor and the sleeve mounted thereon and adapted to clamp the ring blank thereon, a plate member having a flat lower surface adapted to be interposed between the clamping screw and the ring blank, a forming tool adapted to be pivotally mounted on said arbor, said forming tool comprising a bar, a slide member carried thereby, said slide member having a rounded V-shaped nose adapted to engage the ring blank, a spring for normally retracting said slide member, and a manually operable lever engaging said slide member and adapted to hold the same against the ring blank and to bend said ring blank around the sleeve as the forming tool is rotated about the arbor.

In testimony whereof, I have hereunto signed my name.

WALTER SHANLEY ROBERTSON.